Patented June 29, 1926.

1,590,728

UNITED STATES PATENT OFFICE.

AUGUST DORRER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF YELLOW AZO DYESTUFFS.

No Drawing. Application filed January 4, 1926, Serial No. 79,241, and in Germany February 25, 1924.

I have found that yellow azo dyestuffs possessing excellent properties and good affinity to animal fibres, especially silk, leather and wool, are obtained by coupling the diazo compound of a para-chlor-aniline-sulfonic acid with diphenylamine and nitrating the azo dyestuff so obtained. The 4-chlor-1-aniline-3-sulfonic acid is best suitable for the preparation of the azo dyestuff. The said azo compounds are distinguished from the corresponding product free from halogen by being easily nitrated under very mild conditions, especially with a small amount of nitric acid and at ordinary or only slightly elevated temperatures, whereby a decomposition of the molecule is avoided to any substantial amount so that the desired nitro compound is obtained in much better yield than with the azo dyestuffs derived from aniline-sulfonic acid (see G. Schultz, Farbstofftabellen, 5th edition, Nos. 140 and 141) or other halongenated aniline-sulfonic acids. The shade of the resulting nitro azo dyestuffs can be varied according to the conditions of nitration. It is often advantageous to transform the azo dyestuff into its nitroso compound prior to nitration.

The new dyestuffs are distinguished from those prepared in a similar manner from unhalongenated amino-benzene-sulfonic acids by their better affinity to the fibre and by a greater fastness of their dyeings to rubbing.

The following example will further illustrate the manner of carrying out my invention which, however, is not limited to this example. The parts are by weight.

Example.

20.7 parts of 4-chlor-1-aniline-3-sulfonic acid are diazotized in the usual manner by means of 6.9 parts of sodium nitrite and the necessary quantity of hydrochloric acid and combined with 16.9 parts of diphenylamine suspended in acidulated water. When the coupling is completed the dyestuff is filtered off, washed with water, made into a paste by means of a small quantity of water and transformed into the nitroso compound by adding a solution of 7.5 parts of sodium nitrite in 25 parts of water. The resulting solution of the nitroso compound is mixed at ordinary temperature with 12 parts of nitric acid of 41 degrees Baumé and 17 parts of sulfuric acid of 66 degrees Baumé and stirred until the nitration is finished.

The nitro compound so obtained is separated by adding common salt solution, filtered off and transformed into the sodium salt with sodium carbonate solution. The sodium salt is salted out by means of common salt, filtered off and dried. It is probably a mixture of two compounds corresponding to the formulæ

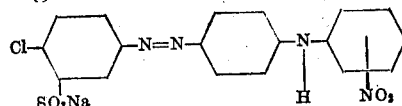

and

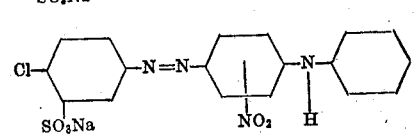

A more yellowish nitro compound is obtained by nitrating the azo dyestuff by means of 46 parts of nitric acid of 41 degrees Baumé and 37 parts of sulfuric acid of 66 degrees Baumé.

I claim:

1. The process of manufacturing yellow azo dyestuffs which consists in coupling the diazo compound of a para-chlor-aniline-sulfonic acid with diphenylamine and nitrating the resulting azo dyestuff.

2. The process of manufacturing yellow azo dyestuffs which consists in coupling the diazo compound of a 4-chlor-1-aniline-3-sulfonic acid with diphenylamine, transforming the azo dyestuff into its nitroso compound and nitrating the latter.

3. As new articles of manufacture, the yellow azo dyestuffs which are nitro derivatives of the azo dyestuff obtainable from para-chlor-aniline-meta-sulfonic acid and diphenylamine.

In testimony whereof I have hereunto set my hand.

AUGUST DORRER.